US009922379B1

(12) United States Patent
Troper et al.

(10) Patent No.: US 9,922,379 B1
(45) Date of Patent: Mar. 20, 2018

(54) ENTITY SOCIAL NETWORK MANAGEMENT AND ENTITY SOCIAL INTERACTIVE CONTROLS

(71) Applicant: Google Inc., Mountain View, CA (US)

(72) Inventors: Dennis Troper, Los Altos, CA (US); Karthik Murili Nagaraj, Livermore, CA (US); Pavan Desikan, Palo Alto, CA (US); David Besbris, Cupertino, CA (US); Amar Gandhi, Mountain View, CA (US); Michael Nestler, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/668,158

(22) Filed: Nov. 2, 2012

Related U.S. Application Data

(60) Provisional application No. 61/556,143, filed on Nov. 4, 2011.

(51) Int. Cl.
*G06F 3/048* (2013.01)
*G06Q 50/00* (2012.01)
*G06F 3/0482* (2013.01)
*H04L 12/58* (2006.01)

(52) U.S. Cl.
CPC ........... *G06Q 50/01* (2013.01); *G06F 3/0482* (2013.01); *H04L 51/32* (2013.01)

(58) Field of Classification Search
CPC ........ G06Q 50/01; G06Q 30/02; G06Q 10/10; H04L 51/32; H04L 67/306; G06F 3/0482; G06F 3/04817; G06F 3/04842

USPC .......................................... 715/741, 742, 751
See application file for complete search history.

(56) References Cited

U.S. PATENT DOCUMENTS

| 8,380,639 | B2 * | 2/2013 | Aleong et al. | 705/319 |
| 2006/0031772 | A1 * | 2/2006 | Valeski | 715/751 |
| 2010/0318571 | A1 * | 12/2010 | Pearlman et al. | 707/784 |

(Continued)

FOREIGN PATENT DOCUMENTS

WO    WO 2011156832 A1 *  12/2011

OTHER PUBLICATIONS

Joe Kraynak and Mikal Belicove, "The Complete Idiot's Guide to Facebook," Jul. 1, 2010, Alpha Books.*

(Continued)

*Primary Examiner* — Andrew T Chiusano
(74) *Attorney, Agent, or Firm* — Lowenstein Sandler LLP

(57) ABSTRACT

In one aspect, a method is provided. The method includes providing a social network on one or more servers connected to the internet. The method includes identifying an instance where a user takes action to add the social networking account of the entity to a social networking account of the user, and in response to the identification of the user's action, enabling identification of and access to the user by the entity. The method includes enabling the social networking account of the entity to post information to a stream of the user that took action to add the social networking account of the entity to the social networking account of the user. The method further includes presenting a stream view of one or more postings to the user, the one or more postings being from the groups that the user was associated to by the entity.

18 Claims, 11 Drawing Sheets

(56) References Cited

U.S. PATENT DOCUMENTS

| | | | |
|---|---|---|---|
| 2012/0110052 A1* | 5/2012 | Smarr | G06Q 10/10 709/201 |
| 2012/0130794 A1* | 5/2012 | Strieder | 705/14.27 |
| 2013/0066986 A1* | 3/2013 | DiCosola | G06Q 10/10 709/206 |
| 2016/0285790 A1* | 9/2016 | Szeto | G06Q 30/0631 |

OTHER PUBLICATIONS

"Facebook Business Accounts," Oct. 12, 2009, available at http://web.archive.org/web/20091019123939/http://masterful-marketing.com/facebook-business-accounts.*

Adam Ostrow, "Target Facebook Page Updates by Location or Language," Nov. 20, 2009, available at http://web.archive.org/web/20091123094833/http://mashable.com/2009/11/20/target-facebook-page-updates-by-location-or-language.*

* cited by examiner

ENTITY SOCIAL NETWORK MANAGEMENT AND ENTITY SOCIAL INTERACTIVE CONTROLS

CLAIM OF PRIORITY

This application claims priority to U.S. Provisional Patent Application No. 61/556,143, filed Nov. 4, 2011, entitled "Entity Social Network Management and Entity Social Interactive Controls," the disclosure of which is incorporated by reference herein.

BACKGROUND

The present disclosure relates to methods, systems, and computer programs for managing a social networking system.

In recent years, social networks have gained in popularity amongst internet users. Social networks typically enable users to hold representative accounts, and designate connections to other account holders such as friends or family members on the same social network. These connections determine a user's social graph, which defines the user and the others with whom the user is connected on the social network. Users can conduct a variety of activities based on their social graph, such as share information and media with others, receive updates from others, comment on posted information, play games, chat, etc.

SUMMARY

Embodiments of the present disclosure provide methods, systems, and computer programs for managing a social networking system. It should be appreciated that the present disclosure can be implemented in numerous ways, such as a process, an apparatus, a system, a device or a method on a computer readable medium. Several embodiments of the present disclosure are described below.

In one embodiment, a method for managing interactions between a social networking account of an entity and a social networking account of a user is provided. The method initiates with providing a social network on one or more servers connected to the internet, the one or more servers including instructions for rendering a plurality of social networking accounts including the social networking account of the entity. The method includes identifying an instance where a user takes action to add the social networking account of the entity to a social networking account of the user, and in response to the identification of the user's action, enabling identification of and access to the user by the entity. In one embodiment, the method includes providing an organization tool for the social networking account of the entity to enable the entity to associate the user to one or more groups, and enabling the social networking account of the entity to post information to a stream of the user that took action to add the social networking account of the entity to the social networking account of the user. The method further includes presenting a stream view of one or more postings to the user, the one or more postings being from the groups that the user was associated to by the entity. Each of the operations of the method is executed by a processor.

In one embodiment, the entity is prevented from identifying or accessing the user prior to the identification of the user's action to add the social networking account of the entity to the social networking account of the user.

In one embodiment, the stream view is provided in response to an action from the user to view a profile page associated with the social networking account of the entity.

In one embodiment, the stream view is provided on a page associated with the social networking account of the user. In one embodiment, the method further includes, in response to the identification of the user's action, detecting a profile of the user and associating the user to one or more groups defined by the social networking account of the entity based on the user's profile as directed by assignment logic.

In one embodiment, the profile of the user includes one or more of age, gender, geo-location.

In one embodiment, the organization tool enables the entity to view a profile of the user and enables moving of the user to the one or more groups.

In one embodiment, the plurality of social networking accounts collectively define a social graph, the social graph defining links between the social networking accounts.

In one embodiment, the user's action to add the social networking account of the entity to the social networking account of the user includes defining a link from the social networking account of the user to a page associated with the social networking account of the entity.

In one embodiment, enabling identification of and access to the user by the entity include adding the user to a list of followers defined for the social networking account of the entity.

In one embodiment, the information posted by the entity includes one or more of text, an image, audio, video, a link, an indicator of endorsement.

In one embodiment, presenting the stream view includes filtering postings of the entity based on the groups that the user was associated to by the entity.

In another embodiment, a non-transitory computer readable medium have program instructions for managing interactions between a social networking account of an entity and a social networking account of a user is provided. The computer readable medium includes program instructions for providing a social network on one or more servers connected to the internet, the one or more servers including instructions for rendering a plurality of social networking accounts including the social networking account of the entity; program instructions for identifying an instance where a user takes action to add the social networking account of the entity to a social networking account of the user; program instructions for, in response to the identification of the user's action, enabling identification of and access to the user by the entity; program instructions for providing an organization tool for the social networking account of the entity to enable the entity to associate the user to one or more groups; program instructions for enabling the social networking account of the entity to post information to a stream of the user that took action to add the social networking account of the entity to the social networking account of the user; and program instructions for presenting a stream view of one or more postings to the user, the one or more postings being from the groups that the user was associated to by the entity.

In another embodiment, a system is provided for managing interactions between a social networking account of an entity and a social networking account of a user. The system includes one or more servers connected to the internet for providing a social network, the one or more servers including instructions for rendering a plurality of social networking accounts including the social networking account of the entity. The system further includes logic for identifying an instance where a user takes action to add the social networking account of the entity to a social networking account of the user; logic for, in response to the identification of the user's action, enabling identification of and access to the user by the entity; logic for providing an organization tool for the social networking account of the entity to enable the entity to associate the user to one or more groups; logic for enabling the social networking account of the entity to post information to a stream of the user that took action to add the social networking account of the entity to the social networking account of the user; and logic for presenting a stream view of one or more postings to the user, the one or more postings being from the groups that the user was associated to by the entity.

These and other embodiments may provide one or more of the following advantages. A non-person entity may interact over a social network in meaningful ways while respecting the privacy of personal users. Furthermore, an entity may categorize users into various groups based on the individual personal users' characteristics. Accordingly, an entity can generate targeted electronic messages to specific groups which will not be unnecessarily sent to other groups of users. Additionally, personal users can view a profile page of the entity that is customized to the personal user.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following embodiments describe methods, computer programs, and systems for managing a social networking system.

It will be apparent, that the present embodiments may be practiced without some or all of these specific details.

Figure 1A:
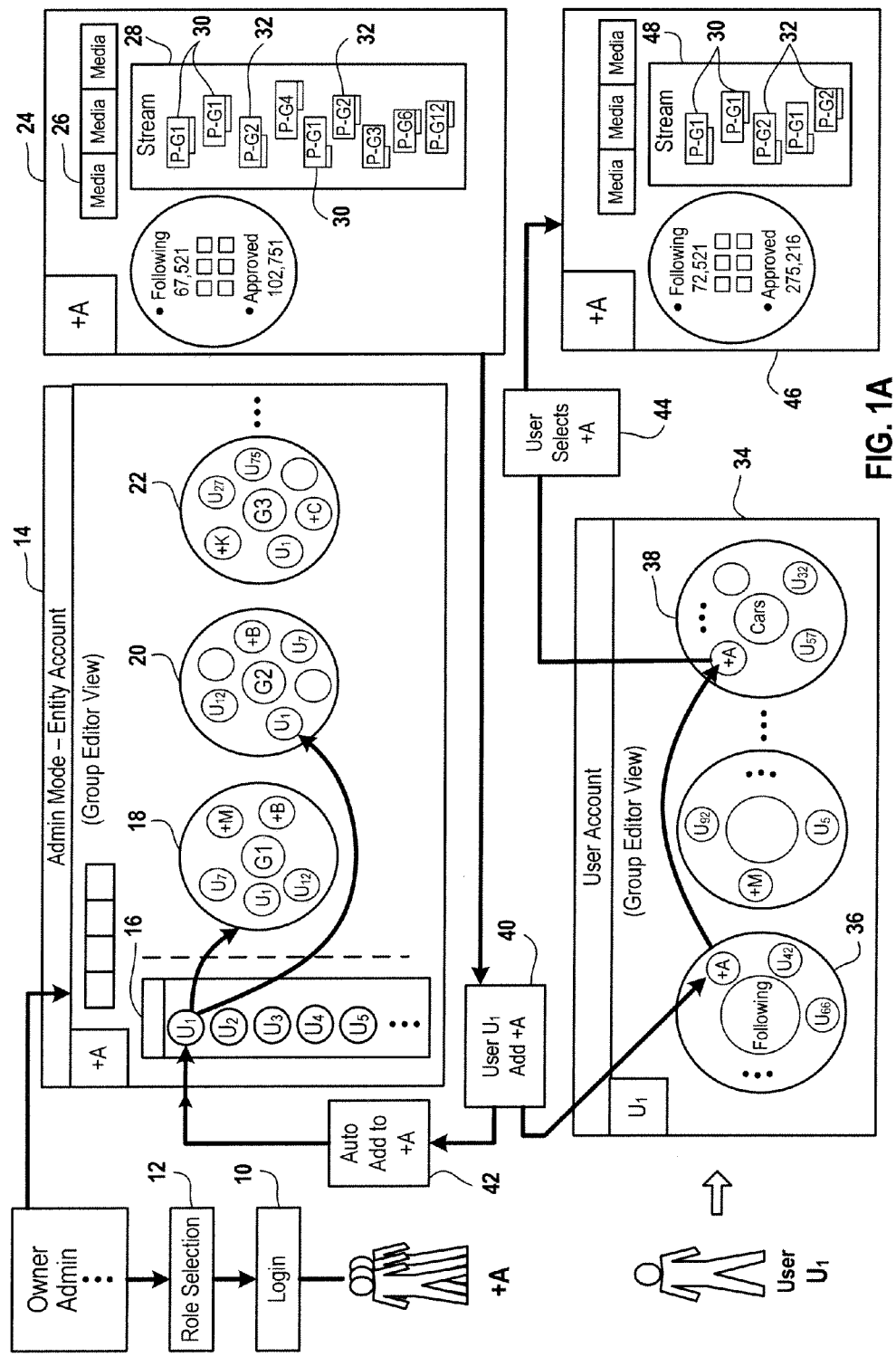
FIG. 1A illustrates an overview of interactions between an entity and a user in a social network, in accordance with an embodiment of the disclosure.

FIG. 1A illustrates an overview of interactions between an entity and a user in a social network, in accordance with an embodiment of the disclosure. As shown, the entity A (denoted by "+A") and the user U1 each are account holders within a social network. The entity A has an entity-type user account while the user U1 has a regular personal user account. As shown, the entity A performs a login operation 10 to access entity A's account. Unlike an individual person, entity A may be a corporation, organization, public figure, or other type of non-person entity. As such, entity A may have multiple representative persons with various levels of permission to access and manage entity A's account. Thus, in one embodiment, a role selection operation 12 is performed upon login to determine the particular role which the person logging in will have, which defines access and management permissions that the person will have while logged in. Various roles can be defined.

For example, in one embodiment, an owner is defined as the only person who can transfer the ownership or delete the entity account. The owner can designate admins which can do anything the owner can except delete the account, transfer ownership, or delete the owner as an admin. In one embodiment, the owner manages the set up and deletion of admins. In other embodiments, there can be various other roles with particular privilege levels to perform management activities related to the entity account. The implementation of various roles permits multiple individuals to manage the same entity account. Conversely, a singular person may manage several entity accounts. This is in contrast to ordinary personal user accounts on a social network, wherein the user account represents a specific individual, that individual presumptively being the only person with access and management privileges for the personal account.

In the illustrated embodiment, users of the social network, including both persons and entities, each have a social graph which defines connections or links between a given user and various other users. In one embodiment, addition of a second user to a first user's social graph requires addition of the first user to the second user's social graph. In another embodiment, such reciprocity is not required, so that a second user can be added to a first user's social graph without the second user being required to add the first user to the second user's social graph. Addition of a user to a social graph generally requires consent of the user. In one embodiment, a user may automatically consent to all additions of the user to the social graphs of others. This can be useful for entities as users, because they may receive large numbers of requests to add them to users' social graphs otherwise, and they may have no interest in declining to be added. However, in one embodiment, an entity can only add a user to their social graph if that user has first added the entity to the user's social graph. This prevents entities from initiating contact with or receiving information about a user until that user chooses to connect to the entity.

Additionally, the users in a social graph of a given user can be associated with particular groups defined by the given user. For example, an individual person having a personal account on the social network may have defined various groups such as friends, family, colleagues, shared interest, etc. Note that a particular user can be included in more than one group. In the case of an entity, the entity may define groups which organize the users in the entity's social graph into meaningful subsets of interest to the entity. For example, if the entity is a retailer, the entity might define groups based on age, gender, geo-location, or other factors of interest to the retailer.

With continued reference to FIG. 1A, entity A (or rather, an individual representative of entity A) has logged in as an administrator to the entity A account and therefore accesses an admin mode 14 which includes access to a group editor view. In the group editor, the entity A is able to view a list of users 16 in entity A's social graph, and various groups which have been defined for entity A, such as group G1 (reference 18), group G2 (reference 20), and group G3 (reference 22). Via the group editor, the admin is able to manage the placement of users in groups, including associating users in the social graph to one or more groups as well as deleting users from groups.

In the illustrated embodiment, the entity A account defines a public page 24 which is accessible by non-users of the social network, or those that are not logged in to the social network. As shown, the public page 24 includes links to media 26, as well as a stream 28 which contains posts made by the entity A. The posts can contain various types of information, such as text, images, videos, links, etc. Each post can be posted to one or more particular groups. For example, posts 30 were all posted to group G1, whereas posts 32 were each posted to group G2. The stream 28 on the public page 24 of the entity A shows all of these posts as well as others posted to other groups in reverse chronological order.

As indicated by reference numeral 40, the user U1 adds the entity A to U1's social graph. Within U1's account (U1 being an individual person), the entity A is first added to a generic "Following" group 36. From a group editor view 34, the user U1 is able to edit their groups, and so chooses to associate the entity A to a "Cars" group 38. Furthermore, the addition of entity A to user U1's social graph triggers automatic addition of user U1 to entity A's social graph, as indicated at reference numeral 42. As shown, the user U1 is thus shown in the list 16 of users having added entity A to their social graphs. In the example shown, the user U1 is added to both group G1 and group G2 within entity A's social graph. This can be performed according to an automated process or manually via the group editor which provides an organizational tool to manage placement of users in groups.

When the user U1 selects the entity A at operation 44 to view the profile page 46 of the entity A, the view of the page is tailored to user U1 based on the assignment of user U1 to groups G1 and G2 within the entity A account. Thus, in the view of the profile page 46 presented to the user U1, the stream 48 is filtered to only include those posts which were posted by entity A to groups G1 and G2, of which user U1 is a member. In this manner, the user U1 can be presented with relevant posts in the stream based the user's affiliation to certain groups.

Figure 1B:
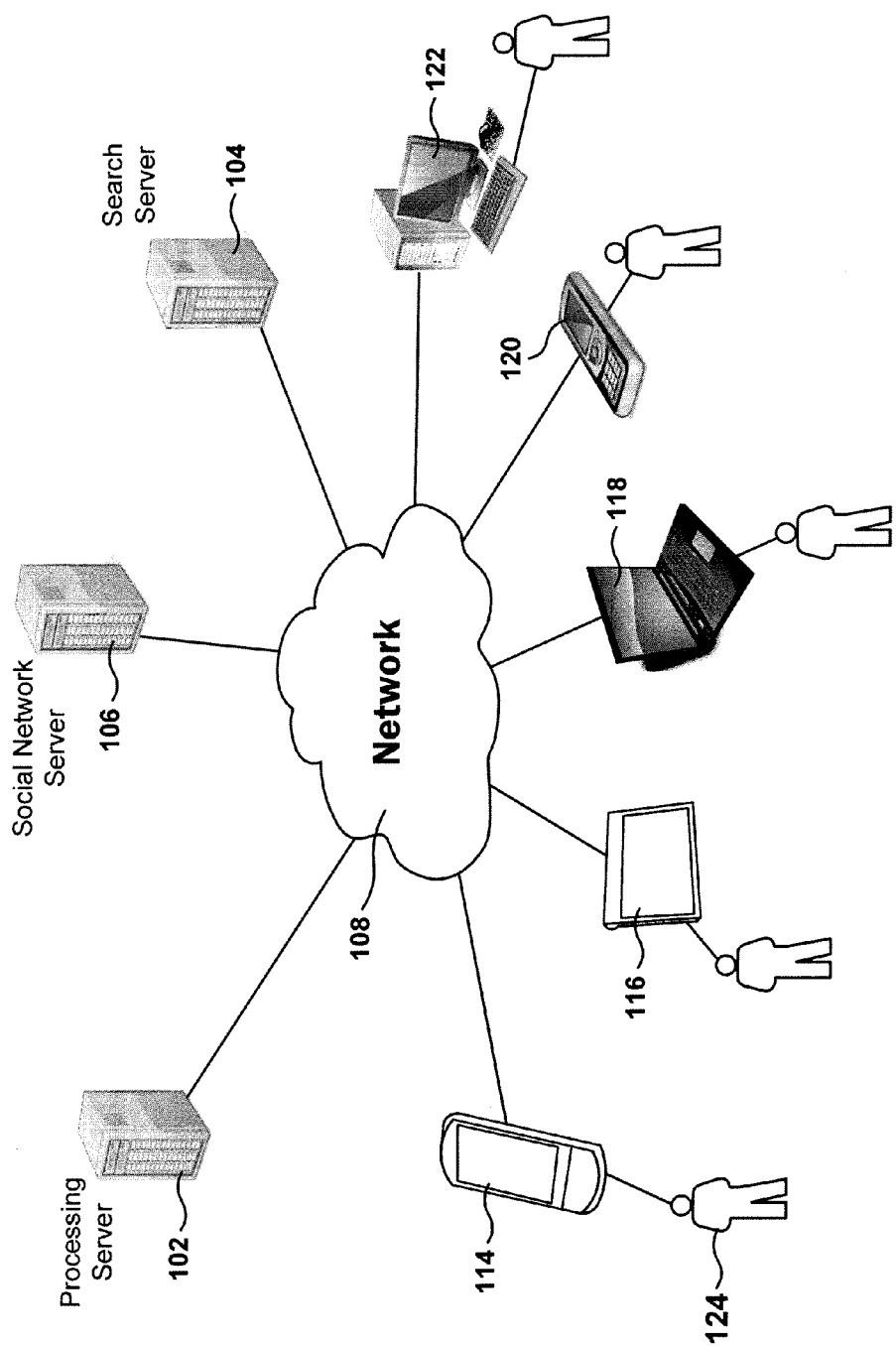
FIG. 1B illustrates a generic architecture of a system for implementing embodiments of the disclosure, according to one embodiment.

FIG. 1B provides one example architecture of a system that may utilize embodiments described herein. Users 124 interact with each other in the context of a social network, where users include real people and entities. In one embodiment, entities perform interactive actions similar to people, although an entity may not be an individual person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name. In addition, each account includes a profile of the user with additional information about the user, such as birth date, gender, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one embodiment, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one embodiment, the relationships established in the social network may be utilized in other contexts. Processing server 102 manages the electronic messages between persons and non-person entities, by enforcing rules that enable or disable electronic messages and/or actions within the social network. Search server 104 provides Internet search capabilities. The various devices and servers may communicate over a network 108.

In one embodiment, the social network provides customizable controls that people may use to manage interactions and electronic messages with non-person entities. In one example, the logic executing the social network may define various services and controls. One example service is designed for real person users (e.g., user accounts). Another example service is designed for non-person entities (e.g., entity accounts). The entity account of the entity, on the other hand, is similar to a user account of a person, however the services and controls may be different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, communicating, sharing, and generally interacting within the social network. In one embodiment, this interface for entities is referred to as entity pages and can be indicated by a token, e.g., "+", followed by the name of the entity in the social network (e.g., Acme corporation has a "+Acme" page). Real-persons have "person pages," which are different from plus pages and have different functionality, although some features are common to both plus pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person is in control of her relationships with entities (e.g., plus pages). In one embodiment, interactions between person and entity requires person approval (e.g., an addition of the plus page to the person's social network, or a mention by the person of the entity, which are discussed in more detail below). Otherwise, plus pages present a similar behavior as person pages, once the person has initiated engagement with the entity.

It is noted that the embodiments illustrated in FIG. 1B are exemplary. Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1B should therefore not be interpreted to be exclusive or limiting, but rather exemplary or illustrative.

Figure 2:
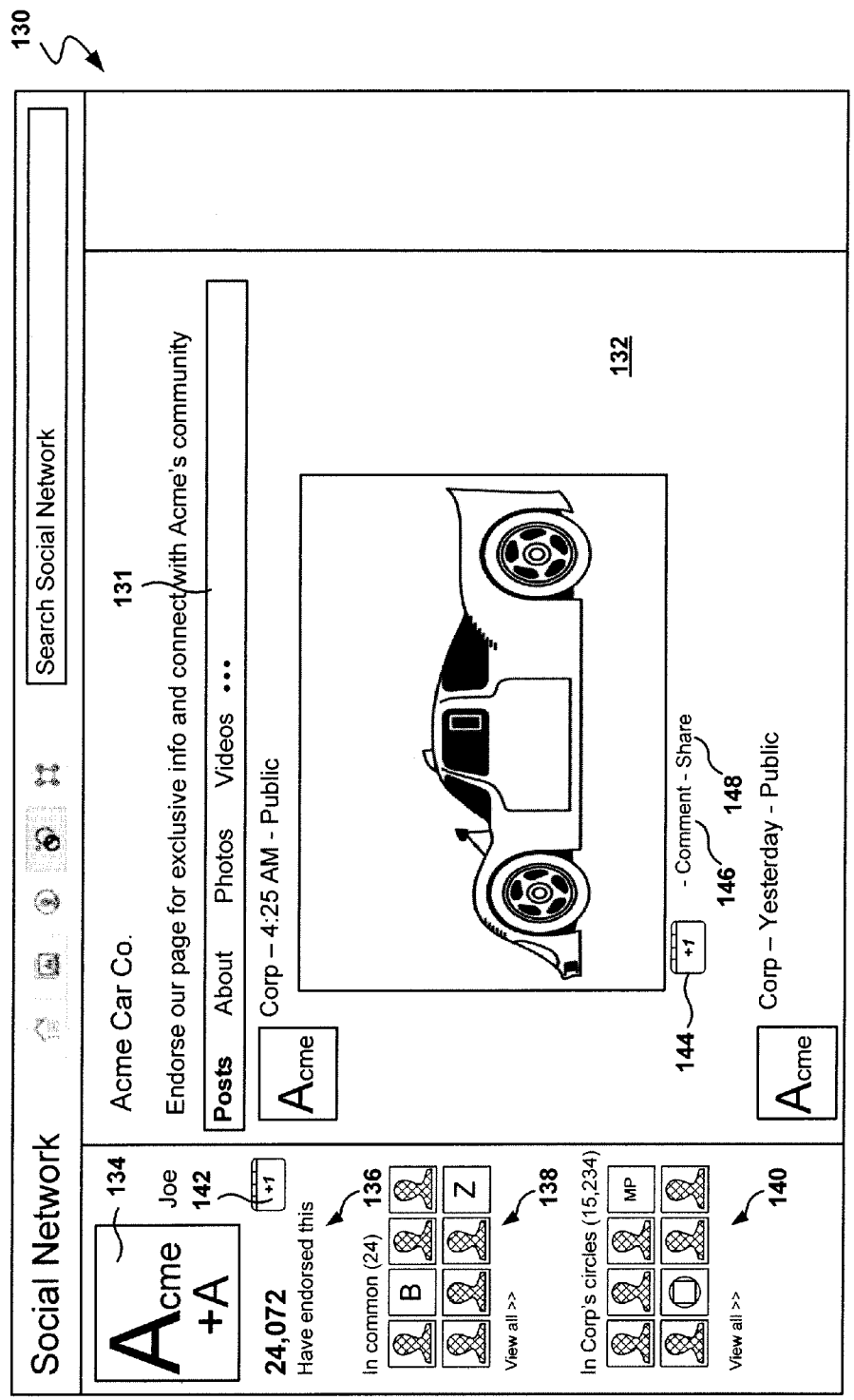
FIG. 2 shows a profile page of an entity in the social network, according to one embodiment.

FIG. 2 shows a profile page 130 of an entity in the social network, according to one embodiment. When a user clicks on the name of another user, the profile page associated with the user is presented. FIG. 2 shows the profile page for an entity. The profile page includes a menu bar 131 containing various tabs for "Posts," "About," "Photos," and "Videos," by way of example and not limitation. The selection of the various tabs governs the display of information in the middle panel 132.

In the illustrated embodiment, the "Posts" tab has been selected; hence, posts from the entity that are visible to this user are presented in the middle panel 132. It will be appreciated that in various embodiments the posts which are visible to the user may depend on various factors such as the particular groups associated with the entity to which the user has been added by the entity. In accordance with embodiments of the disclosure, the user is able to interact with particular posts in various ways. For example, the user can indicate endorsement of the post by clicking on an endorsement button 144. Also, the user may comment on the post by clicking on a comment button 146. Additionally, the user may share the host by clicking on a share button 148 and selecting additional users within the user's social graph with whom to share the post.

When the "About" tab is selected, information about the entity is displayed in the middle panel 132. The specific information displayed is configurable by the entity, and may include various descriptive information about the entity, such as its history, mission statement, location and contact information, related websites, and various other types of information which may be of interest to users visiting the page 130. When the "Photos" tab is selected, various images or photos which have been made available by entity are shown in the middle panel 132. Similarly, when the "Videos" tab is selected, various videos which have been uploaded by the entity are made available in the middle panel 132 to the user.

The profile page 132 includes an icon 134 associated with the entity and the name of the entity next to the icon 134. In addition, an endorsement button 142 provides an input for the person to endorse the entity associated with the profile page. Counter 136 provides information about the number of people that have endorsed this entity. In one embodiment, the profile page of a person does not include endorsement button 142 because endorsements for people are not supported by the social network.

Profile page 132 also includes information about users that the user has in common 138 with this company. This information helps the entity to improve its corporate image by showing relationships of the user that also are associated with the entity. In addition, information 140 is provided about users or entities of the social network that are in the entity's circles but that are not currently in any of the user's circles.

The social network enforces a privacy policy to protect people from undesired solicitations. The policy defines two types of users, real people and entities. The rules for electronic messaging within the social network are different for real people and for entities. A person may initiate contact with an entity, but the entity cannot initiate contact with the person. Once the person establishes a social link with the entity, then the entity may reciprocate by communicating with the person. An entity may initiate contact with other entities, but not with real people. This policy puts real persons in command of the electronic message flow between person and entity.

In one embodiment, the privacy policy defines that people may not have automatic acceptance of tags for photos posted on the social network by entities. However, there can be automatic acceptance of tags from entities by other entities.

Figure 3A:
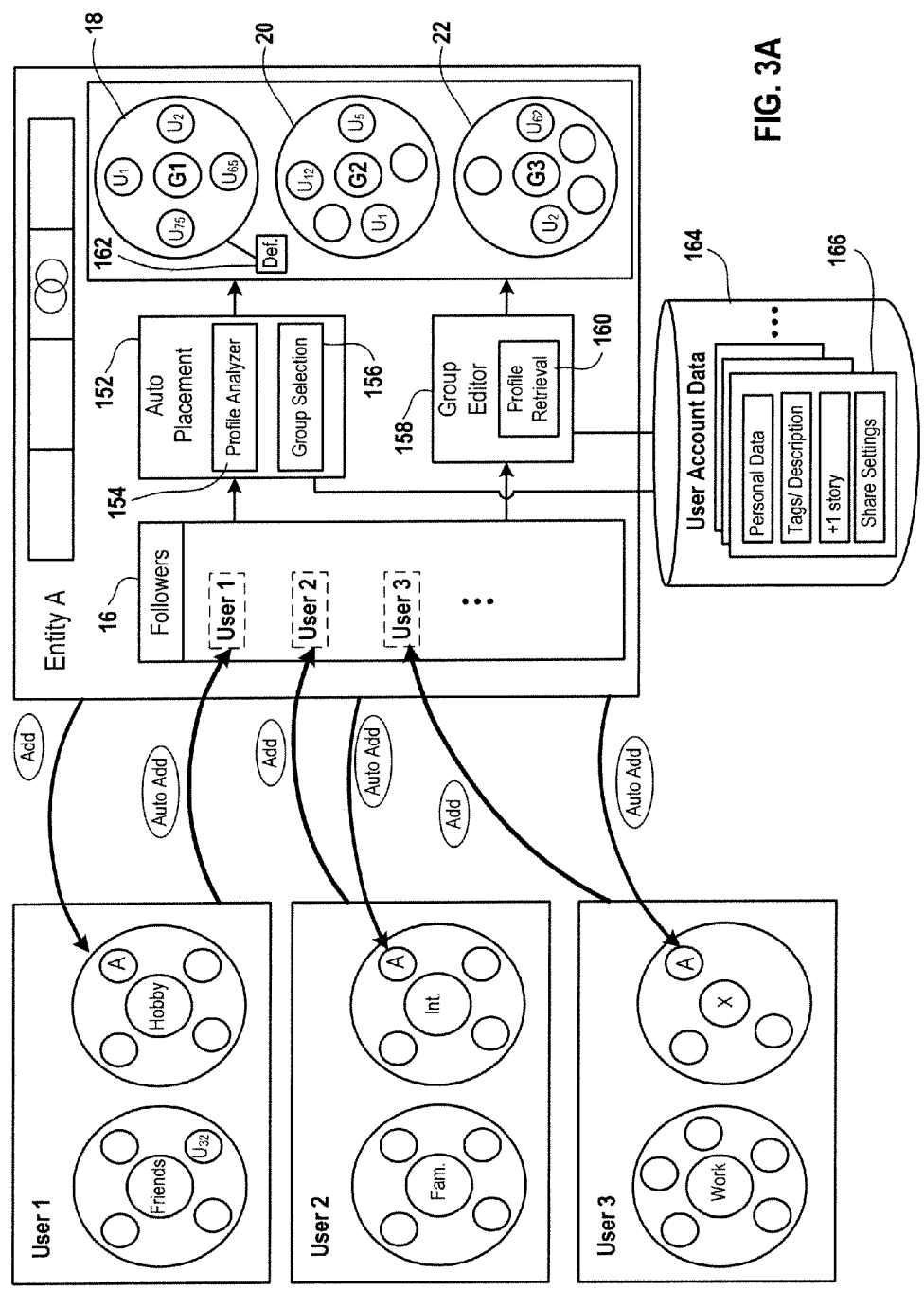
FIG. 3A schematically illustrates the placement of users into various groups defined for the social networking account of an entity.

FIG. 3A schematically illustrates the placement of users into various groups defined for the social networking account of an entity. In the illustrated embodiment, a user 1 has added the entity A to his social graph, and placed the entity a within a group designated as "Hobbies." In a similar fashion, a user 2 and user 3 have each also added the entity A to specific groups within their social graph. The action taken by the users to add entity A to their respective social graphs triggers an automatic addition of those users to a list of followers 16 associated with the entity A. In one embodiment, the list of followers 16 indicates those users which have added the entity A to their respective social graphs, but for which the entity A has not reciprocated by adding them to entity A's social graph. Accordingly, those users may be added to one or more groups defined for the entities social network account in either an automatic fashion or via a manual placement process.

To facilitate automatic placement of users within groups, and auto placement module 152 is defined. The auto placement module 152 includes a profile analyzer 154 which accesses user account data 164 to retrieve and analyze the profile of a given user. The user account data 164 includes various user accounts 166, each of which includes various types of data, such as personal data, tags or descriptive data about the user, history data which details a given user's prior activity on the social network, and share settings. In one embodiment, the share settings indicate the particular user's preferences for what kinds of data can and cannot be shared across the social network, and in particular, with entities such as entity A. Based on the share settings of a particular user, the profile analyzer 154 retrieves and analyzes data about a given user to determine a profile of the user. A group selection module 156 then compares the profile of the user to various group definition data 162 which indicates characteristics or definitions which apply to a specific group, and determines which of the groups associated with the entities account in which the user should be placed. In this manner, a user is automatically placed in one or more groups associated with the entity's social networking account based on characteristics of the user which the user has voluntarily agreed to share with the entity.

It will be apparent that in various embodiments the profile analyzer 154 may analyze any of various kinds of user data, such as age, gender, geolocation, interests, posting data, comments, and any other data related to the user which may be accessed by the entity according to the users specific share settings. In one embodiment, the profile analyzer 154 parses descriptive information associated with the user so as to identify keywords which may correspond to definition data of particular groups. It will also be apparent that the group definition data 162 for a given group may define the group to have any of a variety of characteristics. Merely by way of example, groups may be defined for specific locations, or any other characteristic which may be common across users and of interest to the entity.

Alternatively, a given user may be manually placed into one or more groups by utilizing a group editor 158. The group editor 158 includes a profile retrieval tool 160, which enables the entity to retrieve user data for evaluation so as to determine which groups in which the user should be placed. It will be apparent that even after users have been automatically placed within one or more groups, the entity may utilize the group editor 158 to manually add or remove users from various groups. Additionally, the group editor 158 facilitates the creation and removal of groups and the assignment of group definition data 162.

In the illustrated embodiment of FIG. 3A, user 1 has been added to group G1 only. User 2 has been added to groups G1 and G2, and user 3 has been added to groups G1, G2, and G3.

Figure 3B:
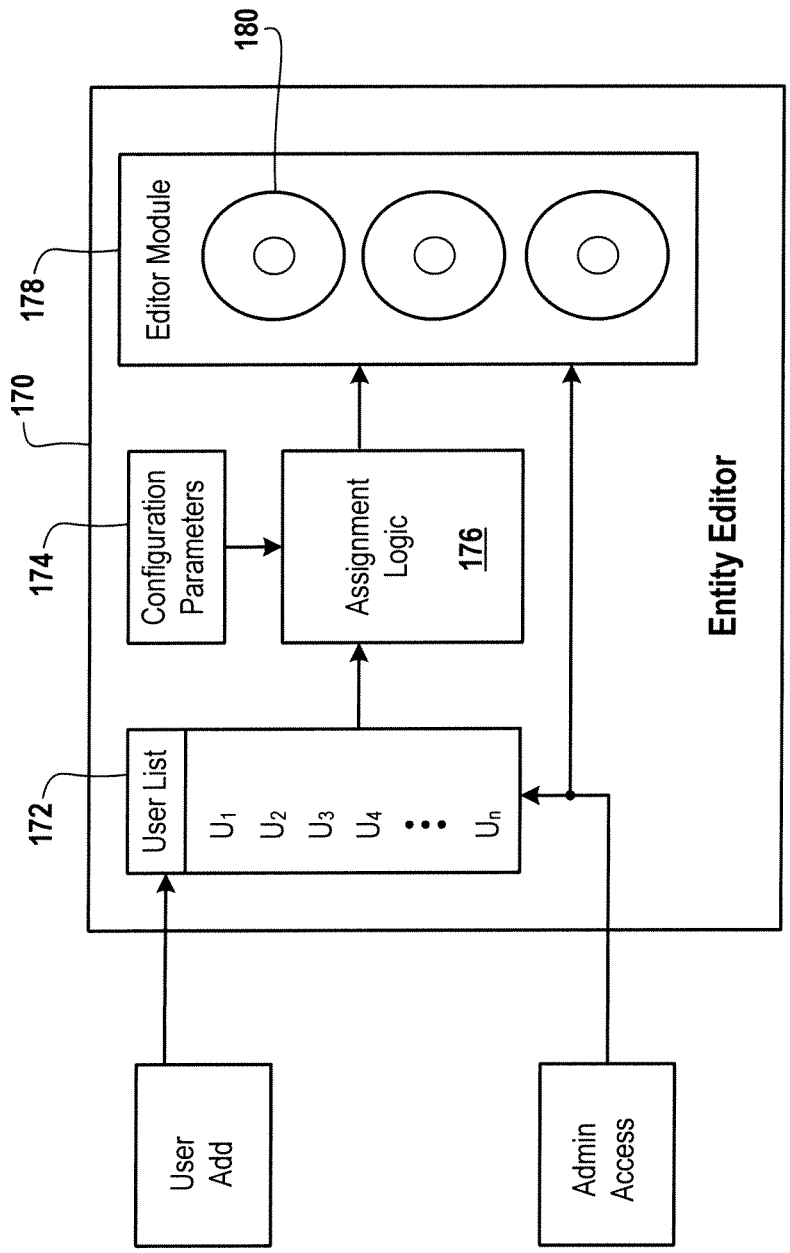
FIG. 3B illustrates an entity editor configured for assignment of users to various groups associated with an entity social networking account, in accordance with an embodiment of the disclosure.

FIG. 3B illustrates an entity editor configured for assignment of users to various groups associated with an entity social networking account, in accordance with an embodiment of the disclosure. As shown, users who have added the entity to their social graph or otherwise consented to their addition to the entity social graph are added to a user list 172. An editor module 178 manages the placement of users within various groups 180. In one embodiment, assignment logic 176 is provided for assigning users from the user list 172 to one or more of the groups 180. The assignment logic 176 determines the assignment of users to particular groups based on various configuration parameters 174. The configuration parameters 174 are determined by the entity and define how users should be placed within various groups based on characteristics of the users as well as characteristics of the groups. It will be appreciated that an administrator having access to the entity editor 170 may also directly access the user list 172 and directly assign users to specific groups 180 via the editor module 178.

Figure 4:
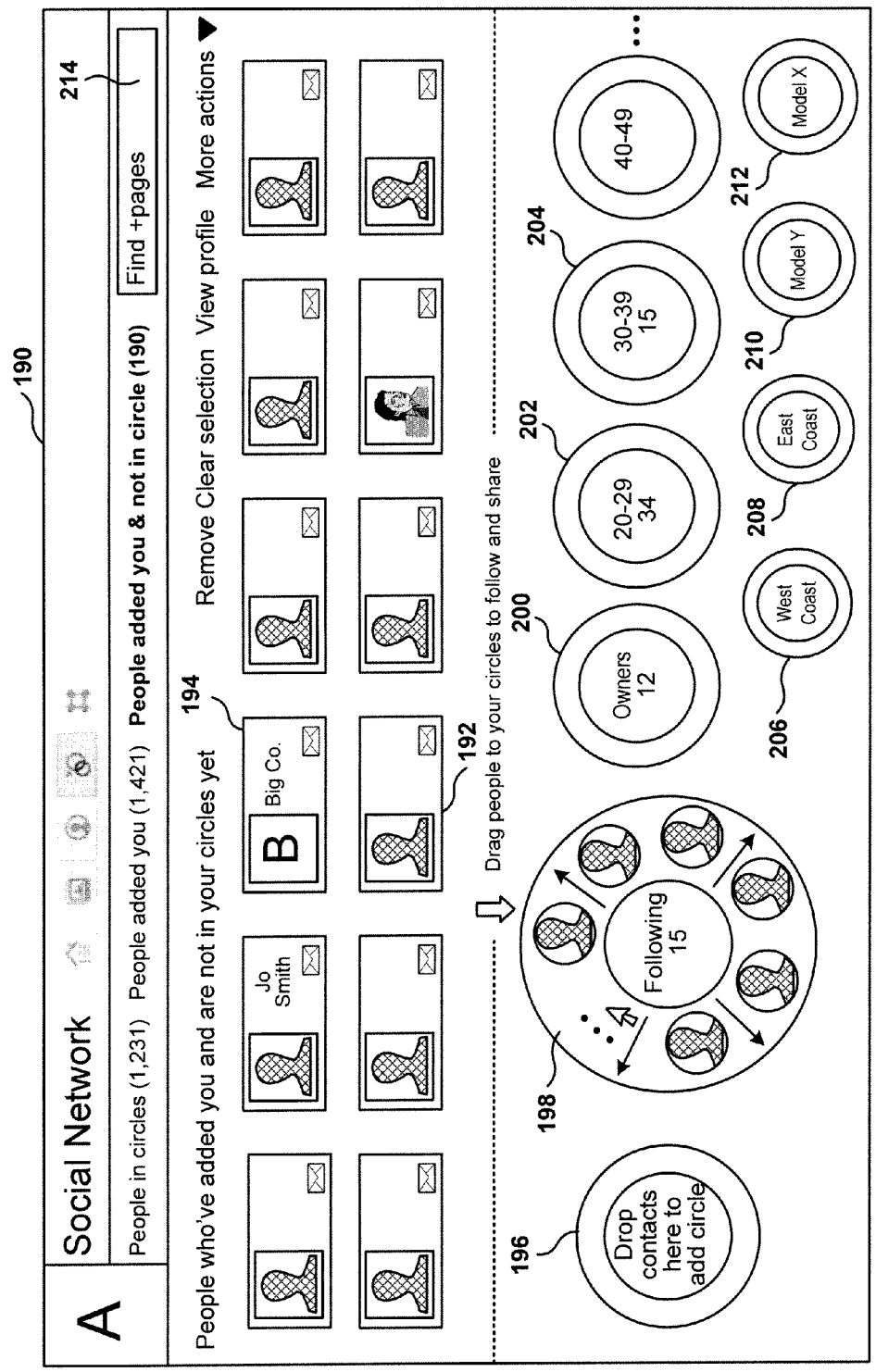
FIG. 4 illustrates a group editor view of a social networking account of the entity, in accordance with an embodiment of the disclosure.

FIG. 4 illustrates a group editor view 190 of a social networking account of the entity, in accordance with an embodiment of the disclosure. In an upper portion of the view, there are shown a number of icons indicating users who have added the entity to their social graph, but have not been added to the entity social graph. These users can include both actual persons, as represented by icon 192, and entities 194, as represented by icon 194. In the lower portion of the view there are various icons indicative of groups associated with the entity's social network account. In one embodiment, the entity accessing the group editor can drag the icon of a given user to one or more of groups 198, 200, 202, 204, 206, 208, 210, or 212 in order to assign a given user to one or more of those groups. In the illustrated embodiment, a "Following" group 198 is defined to contain users whom the entity is following. Additionally, an owner's group 200 is defined to contain owners of products sold by the entity, whereas groups 202 and 204 are configured to contain users having ages falling within particular ranges. Groups 206 and 208 are defined to contain users having specific geo-locations, whereas groups 210 and 212 are defined to contain users associated with a specific product of the entity. Additionally, in one embodiment, an icon representative of a user can be dragged to a new group icon 196, whereupon a new group will be defined for the entity's social network account. In one embodiment, a search box 214 is provided to enable the entity to search for other entities within the social network.

Figure 5:
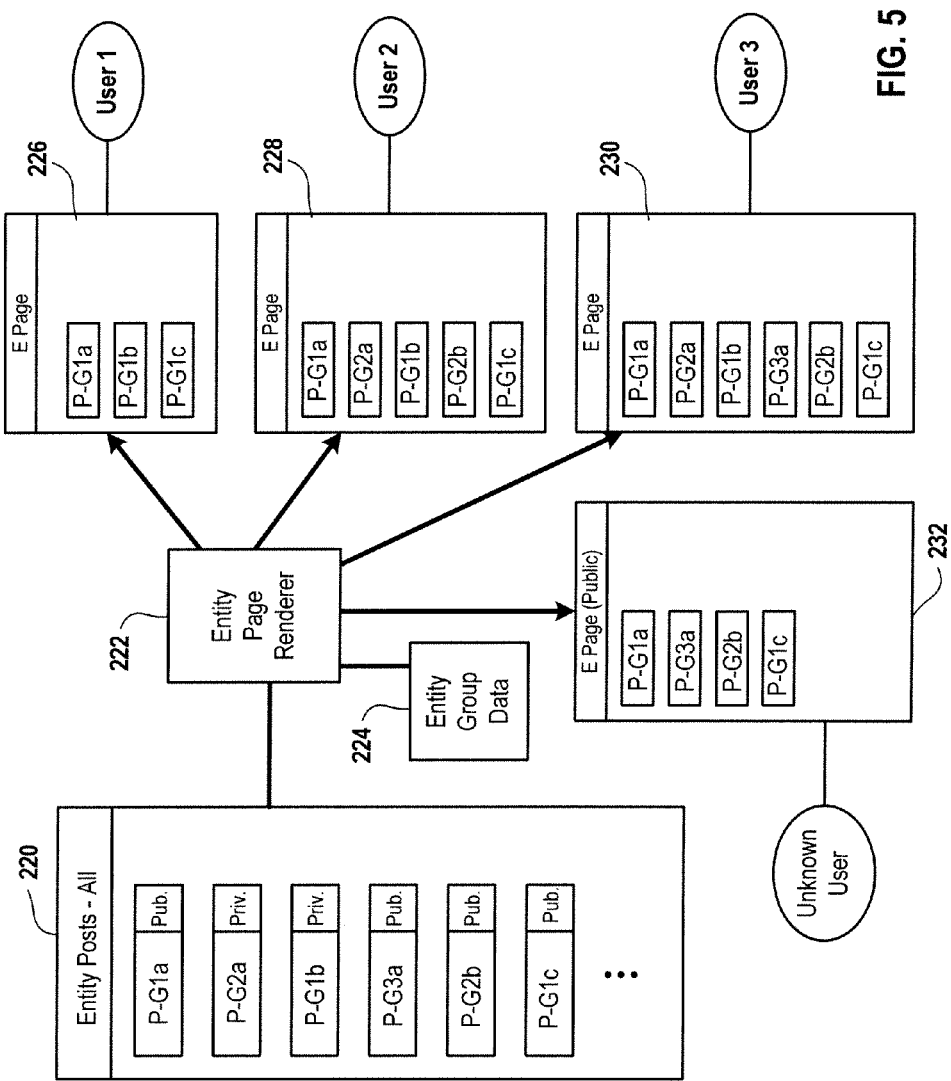
FIG. 5 illustrates how various users view different content on a page of an entity account in a social network, in accordance with an embodiment of the disclosure.

FIG. 5 illustrates how various users view different content on a page of an entity account in a social network, in accordance with an embodiment of the disclosure. A complete listing 220 of posts by the entity the following in chronological order: a first post to group 1 (PG1a), a first post to group 2 (PG2a), a second post to group 1 (PG1b), a first post to group 3 (PG3a), the second post to group 2 (PG2b), a third post to group 1 (PG1c), etc. Additionally, each of the posts may be designated as public or private. The private post will only be available to those users belonging to the group to which the post was posted, whereas a public post is made available to all users. As described above with reference to FIG. 3A, user one was added to group 1 only, whereas user to was added to groups one and two, and user three was added to groups one, two, and three.

With continued reference to FIG. 5, when user one navigates to or otherwise requests to view the page associated with the entities social network account, and entity page renderer 222 renders page 226 two user one based at least in part on user one's placement in group 1 as defined in the entity's group data 224. In one embodiment, the entity page renderer 222 filters out those posts by the entity which have not been posted to group 1 and presents only those posts which have been posted to group 1 to user 1. Thus, in the entity page 226 made available to user one, only posts PG1a, PG1b, and PG1c are shown. In a similar fashion, when user 2 requests to view the entity's page on the social network, user 2 receives a page 228 which includes only those posts which were posted to groups 1 and 2. Thus, the page viewed by user 2 includes posts PG1a, PG2a, PG1b, PG2b, and PG1c. When user 3 requests to view the page of the entity, a page 230 is served to user 3 based on user 3's inclusion in groups 1, 2, and 3. As indicted, the page 230 shows posts PG1a, PG2a, PG1b, PG3a, PG2b, and PG1c.

When an unknown user, such as a user who is not part of the entity's social graph or a person who is not logged in to the social network, accesses the entity's page on the social network, a public page 232 is rendered to the unknown user. On the page 232, only those posts which have been designated as public posts are provided to the unknown user. Thus in the illustrated embodiment, the public page 232 includes posts PG1a, PG3a, PG2b, and PG1c, as these posts have been designated as public.

Figure 6:
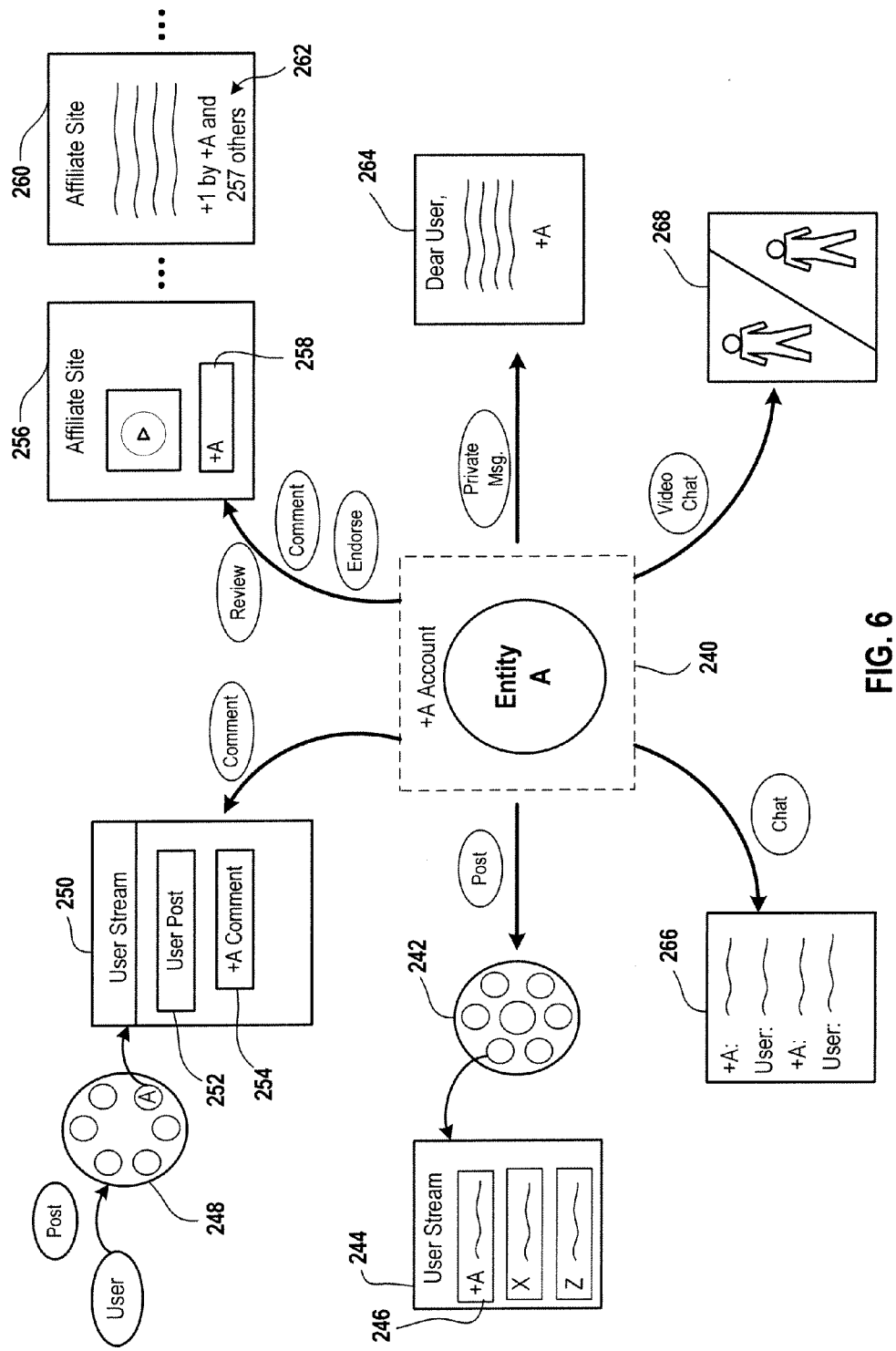
FIG. 6 illustrates various interactive activities conducted by an entity a via the entity's social networking account 240, in accordance with embodiments of the disclosure.

FIG. 6 illustrates various interactive activities conducted by an entity A via the entity's social networking account 240. As has been described, in accordance with certain embodiments, the entity a can post to users who are members of a specific group 242 defined by the entity. For example, when the entity submits a post 246 to the group 242, the post 246 may appear in a posting stream 244 of a given user who is part of the group 242.

In another embodiment, a user is added the entity to their social graph as part of a group 248. When the user posts to the group 248 a user post 252 is generated in the user stream 250. In one embodiment, the entity is able to post a comment 254 in response to the user post 252.

In another embodiment, the entity is able to perform various activities on sites which are affiliated with the social network. For example, an affiliate site 256 may be a site which displays media such as videos, text, images, etc. In one embodiment, the entity is able to post a review or comment 258 in response to a particular media piece. In another embodiment, an affiliate site 260 can be endorsed by the entity, and such endorsement can be added to a counter of endorsements. Also, the entity's endorsement of the affiliate site 260 may be indicated to a user viewing the affiliate site 260 when the user social graph includes the entity (ref. 262).

In another embodiment, an entity can send a private message 264 to a specific user that is part of the entity social graph.

In still other embodiments, the entity can participate in a text chat 266 or a video chat 268.

The foregoing examples of interactions performed by an entity via the entity social networking account 240 are provided merely by way of example and not by way of limitation. It will be apparent to those skilled in the art that in other embodiments, an entity can interact in numerous additional ways both within the social network and on affiliated sites.

Figure 7:
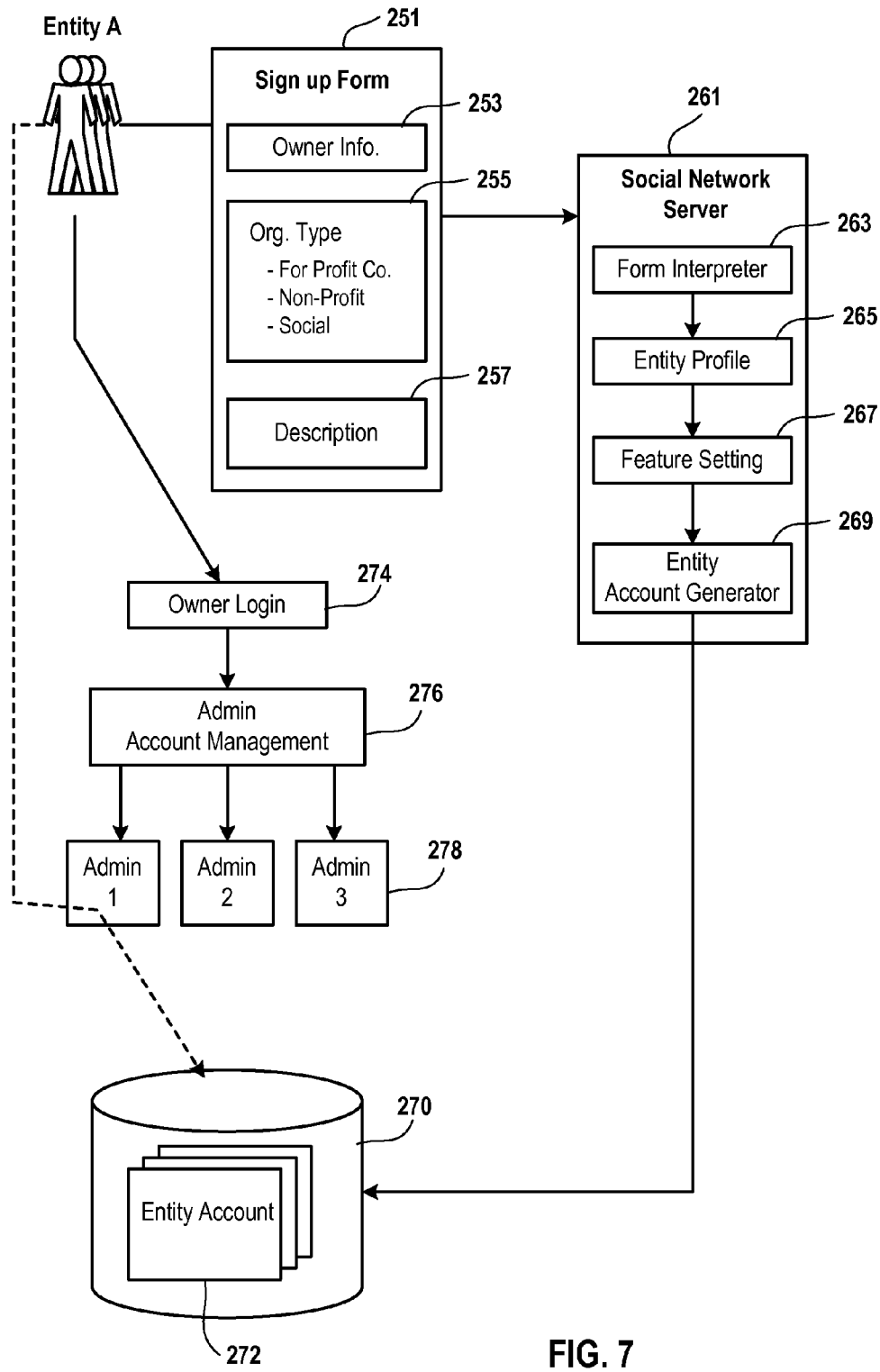
FIG. 7 illustrates how an entity can create and account on a social network, in accordance with an embodiment of the disclosure.

FIG. 7 illustrates how an entity can create and account on a social network, in accordance with an embodiment of the disclosure. In the illustrated embodiment, the entity A accesses a sign-up form 251 to provide information to the social network about the entity and the account which the entity seeks to create. As shown, the entity may be required to provide owner information 253 which describes who the owner of the entity social network account will be, an organization type 255 which indicates the type of organization that the entity comprises, and description information 257, which details various other information about the entity such as its purpose, location, services, goods, etc. A social network server 261 includes a form interpreter 263 which interprets the sign-up form 251 so as to generate an entity profile 265. Based on the entity profile 265, a feature setting module 267 sets the features for the account that is to be created for the entity. Then, an entity account generator 269 creates the entity account 272 within an account database 270.

It will be appreciated that in various embodiments, the particular features which are enabled for the entity's social network account may depend on such factors as the type of organization and the purpose of the organization.

Initially after creation of the entity account 272, the owner performs an owner login 274 and accesses an admin account management module 276. From the admin account management module 276, the owner is able to create and manage various admin accounts 278 for enabling designated persons associated with the entity to access the entity account 272.

Figure 8:
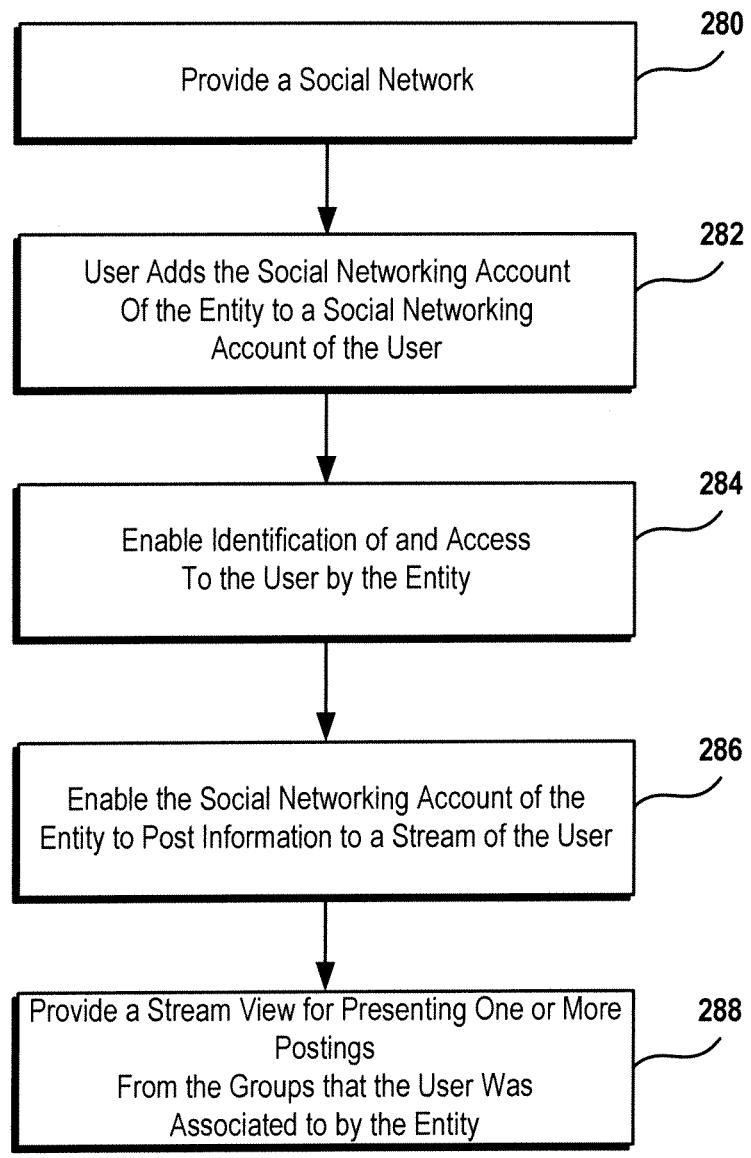
FIG. 8 illustrates a method for presenting a stream of postings from an entity to a user, in accordance with an embodiment of the disclosure.

FIG. 8 illustrates a method for presenting a stream of postings from an entity to a user, in accordance with an embodiment of the disclosure. At method operation 280, a social network is provided on one or more servers connected to the Internet. The one or more servers include instructions for rendering a plurality of social networking accounts including the social networking account of the entity. At method operation 282 and instances identified where a user takes action to add social networking account of the entity to a social networking account of the user. At method operation 284, in response to the identification of the user's action, identification of and access to the user by the entity is enabled. At method operation 286, the social networking account of the entity is enabled to post information to a stream of the user. At operation 288, a stream view is provided for presenting the one or more postings.

Figure 9:
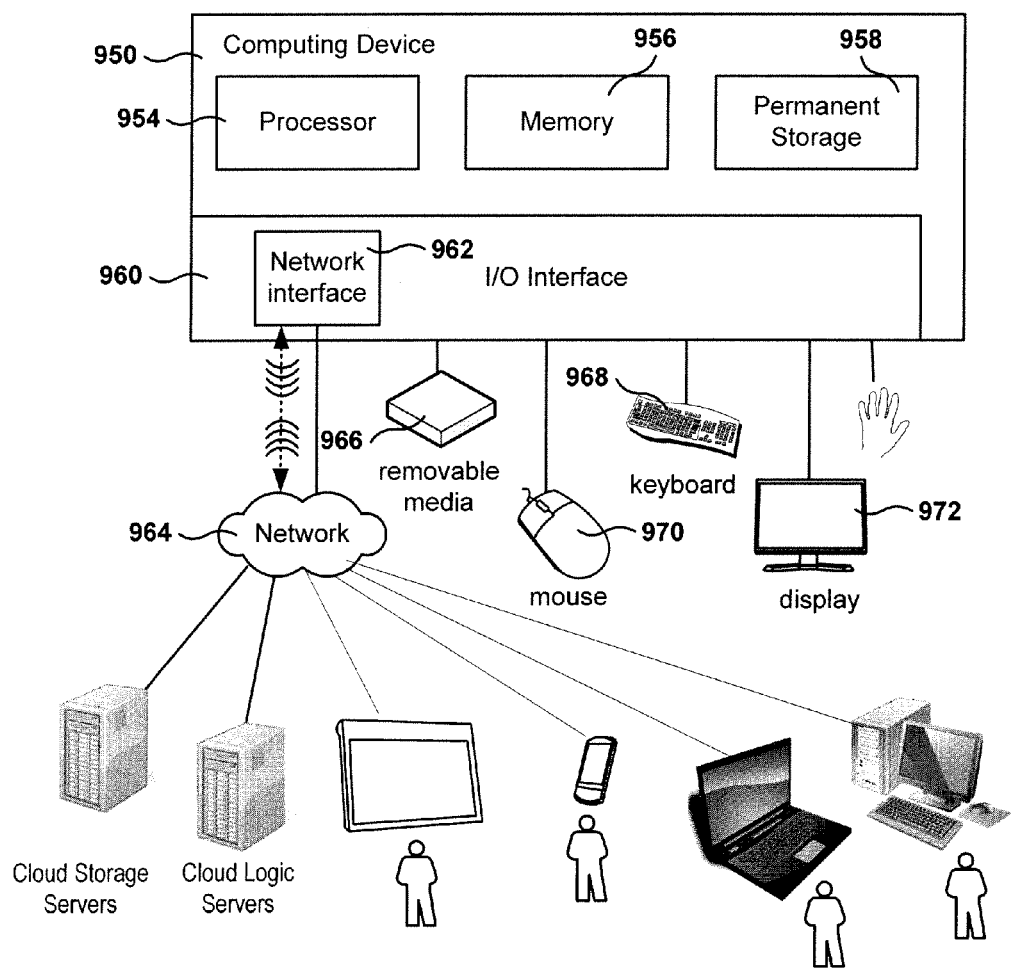
FIG. 9 is a simplified schematic diagram of a computer system for implementing embodiments of the present disclosure.

FIG. 9 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 8. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 964. Network 964 can be, for example the Internet. The Internet is interconnected with a plurality of devices, such as cloud storage servers, cloud logic servers, user interface devices, etc. Some devices that can communicate with the Internet access services on various cloud logic servers and cloud storage can include, for example tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
   providing a social network on one or more servers for rendering a plurality of social networking accounts including a social network account of a user and a social network account of an entity, wherein the social network account of the user is associated with a plurality of groups of the user and the social network account of the entity is associated with a plurality of groups of the entity, wherein the social network account of the user is a personal account of the user on the social network, and the social network account of the entity is a non-person account of the entity on the social network;
   in response to the user's action to add, via a user interface, the social network account of the entity to one of the plurality of groups of the user, adding the social network account of the user to a first list of users associated with the social network account of the entity which have not been previously associated with one or more of the plurality of groups of the entity;
   enabling, by a processor, an identification of and access to the user by the entity and permitting the entity to access the information from the social network account of the user;
   providing an organization tool for the social networking account of the entity to enable the entity to add the social network account of the user on the first list of users to one or more of the plurality of groups of the entity, wherein the organization tool does not allow the entity to add the social network account of the user to any of the plurality of groups of the entity prior to the user's action to add, via a user interface, the social network account of the entity to one of the plurality of groups of the user; and
   in response to adding the social network account of the user to the one or more groups of the entity, removing the social network of the user from the first list of users and providing a stream view of one or more postings for presentation to the user, the one or more postings being from the one or more groups of the entity to which the user has been added.

2. The method of claim 1, wherein the stream view is provided in response to an action from the user to view a profile page associated with the social networking account of the entity.

3. The method of claim 1, wherein the stream view is provided on a page associated with the social networking account of the user.

4. The method of claim 1, further comprising,
   in response to the user's action, detecting a profile of the user and associating the user to one or more groups of the entity defined by the social networking account of the entity based on the user's profile as directed by assignment logic.

5. The method of claim 4, wherein adding the user to one or more groups of the entity is based on a product sold by the entity that is associated with the user.

6. The method of claim 4, wherein the profile of the user includes one or more of age, gender, or geo-location.

7. The method of claim 1, wherein the organization tool enables the entity to view a profile of the user and enables moving of the user to the one or more groups of the entity.

8. The method of claim 1, wherein the plurality of social networking accounts collectively define a social graph, the social graph defining links between the social networking accounts.

9. The method of claim 1, wherein the user's action to add via the user interface, the social network account of the entity to one of the plurality of groups of the user includes defining, via the user interface, a link from one of the plurality of groups of the user to a page associated with the social networking account of the entity.

10. The method of claim 1, wherein enabling the identification of the user and permitting the entity to access the information in the social network account of the user include adding the user to a list of followers defined for the social networking account of the entity.

11. The method of claim 1, wherein the one or more postings include one or more of text, an image, audio, video, a link, or an indicator of endorsement.

12. The method of claim 1, wherein providing the stream view includes filtering postings of the entity based on the groups of the entity that the user was associated to by the entity.

13. A non-transitory computer readable medium to store instructions that when executed, cause a processor to perform operations, the operations comprising:
   providing a social network on one or more servers for rendering a plurality of social networking accounts including a social network account of a user and a social network account of an entity, wherein the social network account of the user is associated with a plurality of groups of the user and the social network account of the entity is associated with a plurality of groups of the entity, wherein the social network account of the user is a personal account of the user on the social network, and the social network account of the entity is a non-person account of the entity on the social network;
   in response to the user's action to add, via a user interface, the social network account of the entity to one of the plurality of groups of the user, adding the social network account of the user to a first list of users associated with the social network account of the entity which have not been previously associated with one or more of the plurality of groups of the entity;
   enabling an identification of and access to the user by the entity and permitting the entity to access the information from the social network account of the user;
   providing an organization tool for the social networking account of the entity to enable the entity to add the social network account of the user on the first list of users to one or more of the plurality of groups of the entity, wherein the organization tool does not allow the entity to add the social network account of the user to any of the plurality of groups of the entity prior to the user's action to add, via a user interface, the social network account of the entity to one of the plurality of groups of the user; and
   in response to adding the social network account of the user to the one or more groups of the entity, removing the social network of the user from the first list of users and providing a stream view of one or more postings for presentation to the user, the one or more postings being from the one or more groups of the entity to which the user has been added.

14. The computer readable medium of claim 13, wherein the operations further comprise,
   in response to the user's action, detecting a profile of the user and associating the user to one or more groups of the entity defined by the social networking account of the entity based on the user's profile as directed by assignment logic.

15. The computer readable medium of claim 13, wherein providing the stream view includes filtering postings of the entity based on the groups of the entity that the user was associated to by the entity.

16. A system comprising:
   a memory; and
   a processor, coupled to the memory, to:
   render a plurality of social networking accounts including a social network account of a user and a social network account of an entity, wherein the social network account of the user is associated with a plurality of groups of the user and the social network account of the entity is associated with a plurality of groups of the entity, wherein the social network account of the user is a personal account of the user on the social network, and the social network account of the entity is a non-person account of the entity on the social network;
   in response to the user's action to add, via a user interface, the social network account of the entity to one of the plurality of groups of the user, add the social network account of the user to a first list of users associated with the social network account of the entity which have not been previously associated with one or more of the plurality of groups of the entity;
   enable an identification of and access to the user by the entity and permitting the entity to access the information from the social network account of the user;
   provide an organization tool for the social networking account of the entity to enable the entity to add the social network account of the user on the first list of users to one or more of the plurality of groups of the entity, wherein the organization tool does not allow the entity to add the social network account of the user to any of the plurality of groups of the entity prior to the user's action to add, via a user interface, the social network account of the entity to one of the plurality of groups of the user; and
   in response to adding the social network account of the user to the one or more groups of the entity, remove the social network of the user from the first list of users and provide a stream view of one or more postings for presentation to the user, the one or more postings being from the one or more groups of the entity to which the user has been added.

17. The system of claim 16, wherein the processor is further to,
   in response to the user's action, detect a profile of the user and associating the user to one or more groups of the entity defined by the social networking account of the entity based on the user's profile as directed by assignment logic.

18. The system of claim 16, wherein to provide the stream view includes filtering postings of the entity based on the groups of the entity that the user was associated to by the entity.

* * * * *